Sept. 8, 1964 S. K. STAUTH 3,148,138
ELEVATING CONVEYOR WITH SEPARATION FEATURE
Filed July 10, 1961
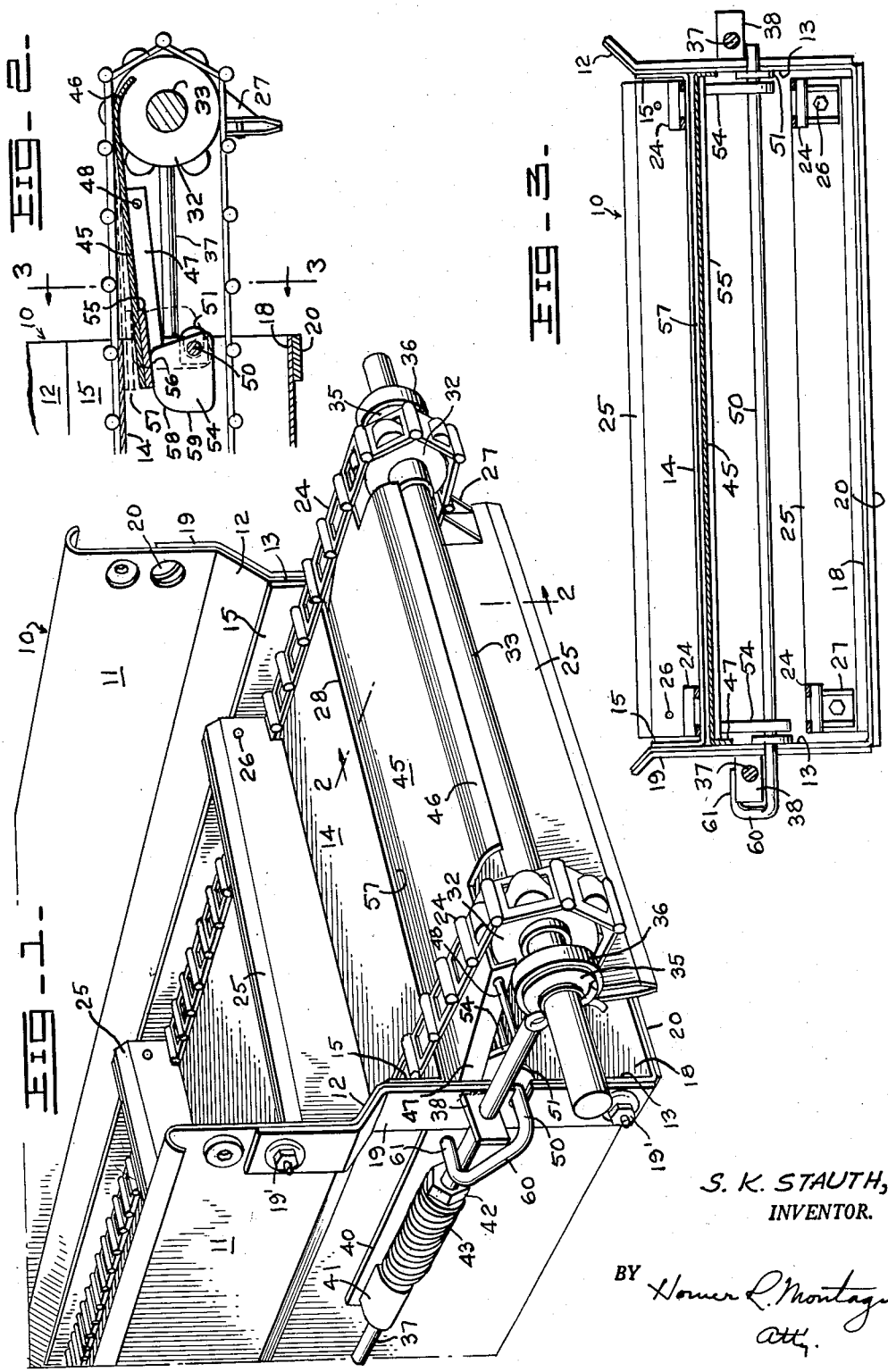
S. K. STAUTH,
INVENTOR.
BY Homer L. Montague
att.

United States Patent Office 3,148,138
Patented Sept. 8, 1964

3,148,138
ELEVATING CONVEYOR WITH SEPARATION FEATURE
Samuel K. Stauth, Compton, Ill., assignor to Mayrath Company, a corporation of Illinois
Filed July 10, 1961, Ser. No. 122,952
13 Claims. (Cl. 209—247)

This invention relates to conveyors, and more particularly to a trough-type elevating conveyor having pusher elements movable as by endless chain members and adapted for use in moving and elevating farm products; and has special reference to a conveyor for use in elevating ear corn and separating or removing any kernels which are shelled from the ears as they are conveyed, the kernels dropping in to a separate discharge path from the whole ears.

It is the common practice on farms to supply ear corn and other farm products to the lower end of a conveyor of the type referred to, and thus to move the products upwardly along the conveyor for discharge from the upper end thereof to trucks, cribs, bins, or other receivers. Where ear corn is so conveyed some of the kernels will become detached from the ears, and it is often desirable to be able to collect and remove such kernels separately from the ear corn. This has been done, for example, by the use of screens in the conveyor floor, which permit any loose kernels to drop therethrough as the corn moves along the conveyor.

An important object of the present invention is to provide an elevating conveyor of the type referred to having at its upper end means for discharging therefrom the ears of corn, free from any admixture of loose kernels which have become separated from the whole ears.

A further object is to provide such a conveyor having at its upper end a discharge apron forming the upper extremity of the conveyor bed or pan, and which apron is provided with a portion at its lower or inner edge which can be dropped or spaced below the upper end of the conveyor pan to provide a slot for the selective discharge between the apron and the pan of any corn kernels which have become detached from the ears.

A further object is to provide a conveyor construction employing a discharge apron which may be selectively adjusted to form substantially a continuation of the conveyor pan or bed for the smooth transition from the upper end of the conveyor of articles other than corn, or for the discharge of ear corn plus kernels, and the following edge of which apron may be lowered to provide a gap or slot between the apron and the adjacent edge of the conveyor pan for the discharge through such gap of loose kernels that have become separated from ears when the conveyor is used for moving ear corn.

A further object is to provide novel cam means for raising and lowering the following edge of the apron, depending upon the use to which the conveyor is to be put.

A further object is to provide raising and lowering means for the apron in the form of an over-center cam which, when turned to elevate the following edge of the apron, effectively sustains the load of the latter and the conveyed material thereon, with no tendency for the cam to turn and drop the apron.

Other objects and advantages of the invention will become apparent during the course of the following description.

In the drawing there is shown one embodiment of the invention. In this showing,

FIGURE 1 is a fragmentary perspective view of a portion of the normally upper end of a conveyor embodying the invention, the conveyor being shown in a horizontal position for clarity, though in use it would normally be tilted to operate as an elevating conveyor;

FIGURE 2 is a fragmentary sectional view taken substantially on line 2—2 of FIGURE 1, and FIGURE 3 is a transverse section on line 3—3 of FIGURE 2.

Referring to FIGURE 1, the numeral 10 designates the conveyor as a whole, and shown as of the trough type having sidewalls 11 converging inwardly intermediate their heights as at 12 and then extending vertically downwardly as at 13. A short distance below the converging wall portions 12 the conveyor is provided with an upper pan or bed 14 having upturned side edges 15 welded or otherwise secured to the adjacent trough wall portions 13. The wall portions 13 extend to the bottom of the trough and then transversely thereacross to form a lower pan or bed 18 spaced substantially below and parallel to the pan 14. The outlet ends of the trough wall portions 11, 12 and 13 are braced by relatively heavy bands 19 shaped to fit the wall portions against which they are engaged, the bands being secured in position as by suitable bolts 19. The bottom wall 18 is braced at its edge by a band or plate 20 extending thereacross and secured thereto by any suitable means, for example by welding or by bolts.

The conveyor is provided with endless transport members shown in the present instance as chains 24 having secured thereto at spaced points therealong suitable pushers 25. These pushers are preferably bolted as at 26 to brackets 27 fixed to the chains, the bolts 26 being removable for the substitution of different types of pushers. The type of pusher shown is adapted for a variety of uses including the moving over the pan 14 of ears of corn to the outlet end 28 of the bed 14.

The chains 24 pass around sprockets 32 at the outlet end of the conveyor shown in FIG. 1, the sprockets being fixed to a shaft 33 extending transversely of the conveyor and arranged beyond the outlet end thereof. The ends of the chains at the inlet end of the conveyor are supported by similar sprockets mounted on a shaft driven from a suitable source of power. Such chain supporting and driving means are conventional and are therefore not illustrated.

The shaft 33 is supported in suitable bearings 35 mounted in cylindrical carriers 36. To each such carrier is welded one end of a rod 37 slidable through an outstanding guide 38, these guides preferably being welded to the straps 19.

An elongated plate 40 is welded or otherwise secured to each sidewall portion 13. Each plate 40 carries a slide bearing 41 in which the forward end of the adjacent rod 37 is adapted to slide. A nut 42 is threaded on each rod 37 substantially spaced from the associated guide 41, and a coil spring 43 is mounted on each rod 37 between the associated guide 41 and nut 42. It will be apparent that the springs 43 exert a force to urge the shaft 33 in the direction necessary to maintain the chains 24 taut. The rods 37 are mounted for sliding movement in a plane parallel to the runs of the conveyor chains and it is obvious that the upper runs of these chains slide directly over the pan 14.

A discharge apron 45 has one edge extending beneath the adjacent end of the pan 14. The apron 45 has its other end extending substantially beyond the end of pan 14 with its extremity 46 curved downwardly over the shaft 33. The apron 45 is substantially coextensive in width with the pan 14 as shown in FIG. 3 and has side portions turned downwardly to form flanges 47. These flanges are pivoted on a pin or rod 48 welded at its ends to the rods 37. Thus the "following" edge of the apron 45 (beneath pan 14) is movable upwardly and downwardly.

A rod 50 extends tranversely of the conveyor and is rotatably supported in any suitable manner relative to the conveyor trough, for example, by plates 51 welded to the trough side walls 13. Adjacent opposite sides of the conveyor, the rod or shaft 50 is provided with cams 54 (FIGURES 2 and 3) engaging a stiffening plate 55 welded or otherwise secured beneath the following edge portion of the apron 45. The cams 54 are provided with corresponding low points 56 engaging the plate 55 when the conveyor is used for moving ear corn, and separating loose kernels therefrom, in which case there will be a gap 57 between the pan 14 and apron 45 as clearly shown in FIG. 2. From the low point 56, each cam is provided with a curved portion 58 engageable with the plate 55 to elevate the apron 45 when the rod 50 is turned in a clockwise direction as viewed in FIGURE 2. Each cam is provided with a flat high point 59 the leading extremity of which, when the cam is turned clockwise in FIGURE 2, moves past a vertical plane through the axis of the rod or shaft 50, thus providing for over-center pressure from the plate 55 and apron 45, and the weight of any material on the apron 45, to maintain the cams in this operative position.

The rod 50 is provided at one end thereof with a portion 60 bent perpendicularly thereto as shown in FIGURES 1 and 3 and the extremity of the rod is bent inwardly as at 61 to provide a handle whose end 61 may rest on the rod 37 when the cams 54 are in the position shown in FIGURE 2. The handle 61 is adapted to be swung upwardly and over the center of the rod 51 through approximately 90 degrees to turn the cams 54 to their operative positions shown in dotted line in FIGURE 2.

*Operation*

The left hand end of the conveyor extending beyond the drawing as viewed in FIGURE 1 is the lower or inlet end, and the right hand end normally is at a substantially higher level to discharge into any suitable receiver the articles or materials moved by the pushers 25. Assuming that ear corn is being conveyed, it is well known that during the conveying operation, some of the kernels will break loose from the ears. The loose kernels, together with the ears, will be swept along the pan 14 by the pushers 25.

When ear corn is being conveyed, and loose kernels are to be separated, the handle 61 will be in the position shown in FIGURE 1, while the cams 54 and apron 45 will be in the solid line positions shown in FIGURE 2. When the ears and any loose kernels are swept over the edge 28 of the pan 14 by movement of successive pushers 25, these kernels will slide through the gap 57 while the ears will be moved by the pusher to the discharge end of the apron 45 to be collected in a suitable receptacle. The loose kernels thus will be separated from the ears and will drop onto the lower pan 20 and will tend to gravitate toward the lower or inlet end of the conveyor. Moreover, the pushers 25 in the lower runs of the conveyor chains will help sweep the loose kernels along the bottom pan. The kernels may be discarded at the inlet end of the conveyor or may be gathered in a suitable receptacle.

Assuming that other types of articles or materials are to be conveyed, or that the separating function is not desired, the handle 61 will be swung under the top of the rod 50 to turn the cam 54 through a 90 degree angle. The leading ends of the flat cam portions 59, shortly before the cams reach the limit of movement through a 90 degree angle, will slightly over-elevate the plate 50 until such portions of the cams pass beyond positions in alignment with a vertical plane through the rod 50. The plate 55 and apron 45 possess sufficient "give" to permit them to be cammed very slightly higher than their normal upper positions to permit the operations referred to to take place. The weight on the portions of the flat surfaces of the cams which have moved over-center relative to the shaft 50 will prevent any reverse movement of the cam away from the position described.

From the foregoing it will be apparent that the present construction is capable of efficient use for coveying any desired articles or materials to elevate them from the inlet end of the conveyor and discharge them at a higher elevation from the outlet end of the conveyor. By the simple operation of swinging the handle 61 through a 90 degree angle, the apron 45 may operate in conjunction with the pan 14 to separate or drop the loose corn kernels, or other small particles, or the move the apron 45 upwardly to form substantially a continuation of the pan 14 when the separating function is not desired.

It has heretofore been proposed to provide conveyors, including elevating conveyors, with some kind of screening or separating means for accomplishing the removal or diversion of relatively smaller articles or particles from the main stream. For example, portions of the conveyor floor have been apertured or provided with screens to effect such separations. The present invention performs the entire separating function substantially at the discharge end, so that kernals (for example) removed even in the last portion of the travel path will be effectively removed. Moreover, the separating aperture is a full-width transverse slot which traps kernels regardless of their lateral location, and is practically immune to clogging. Finally, the localization of the separating function enables a very simple arrangement for putting it selectively into and out of use, and without impairing the structural strength and rigidity of the conveyor floor.

It is to be understood that the form of the invention shown and described is to be taken as a preferred example of the same and that various changes in the shape, size and arrangement of parts may be made as do not depart from the spirit of the invention or the scope of the appended claims.

What is claimed is:

1. A conveyor comprising a trough, endless conveying means for moving material along the bottom of said trough from an inlet end to a discharge end, means forming an extension of the bottom of said trough at the discharge end thereof, and means for supporting the end of said second named means toward said inlet end selectively adjacent to the bottom of said trough to form substantially a continuation thereof or to support said end of said second named means at a lower level than the adjacent end of the bottom of said trough to form therewith a gap through which small articles may fall.

2. A conveyor comprising a trough, endless conveying means for moving material along the bottom of said trough from an inlet end to a discharge end, means forming an extension of the bottom of said trough at the discharge end thereof, rockable cam means engaging the end of said second named means toward said inlet end to move said second named means into an upper position forming substantially a continuation of the bottom of said trough and to drop said end of said second named means to a lower position in which it forms with the bottom of said trough a gap through which small articles may fall.

3. A conveyor comprising a trough, endless conveying means for moving material along the bottom of said trough to a discharge end, means forming an extension of the bottom of said trough at the discharge end thereof, a pair of cams arranged beneath said second named means adjacent said trough and having corresponding low points in one position of said cams in which position the end of said second named means adjacent said trough is engageable in a lower position to form with the bottom of said trough a gap through which small articles may drop, said cams having high portions engageable with said end of said second named means to move it into engagement with the adjacent end of the bottom of said trough whereby such means forms substantially a continuation of the bottom of said trough, and means supporting said cams for simultaneous rocking movement.

4. A conveyor according to claim 3 wherein said means for supporting said cams for simultaneous rocking movement comprises a rod extending transversely of the conveyor and supported near its ends for rocking movement on its axis, said rod outwardly of said trough being bent to form a handle movable to rock said rod and thus rock said cams.

5. A conveyor comprising a trough having a conveyor pan extending from side to side thereof, endless elements movable along said pan adjacent the sides thereof, pushers connected to said endless elements and movable over said pan to move material toward a discharge end of said trough, an apron extending beyond the discharge end of said trough and over which said pushers move, said apron being substantially coextensive in width to said pan, means pivotally supporting said apron for turning movement on an axis transverse to the conveyor and spaced substantially beyond said discharge end of said trough whereby the end of said apron adjacent said trough is movable vertically about said axis, and means selectively operable for maintaining said end of said apron in engagement with the adjacent end of said pan whereby said apron forms substantially a continuation of said pan, and for dropping said end of said apron to a point below said pan to form therewith a gap through which small articles may fall.

6. A conveyor according to claim 5 wherein said selectively operable means comprises a cam device rockable about an axis transverse to said trough to move said end of said apron between said positions.

7. A conveyor according to claim 5 wherein said selectively operable means comprises correspondingly shaped cams engaging said end of said apron at points spaced from each other, and means for simultaneously rocking said cams on an axis transverse to the conveyor, said cams having corresponding low points engageable with said end of said apron when the latter forms said gap with said pan, said cams having corresponding high portions engaging said end of said apron upon rocking movement of said cams to move said end of said apron upwardly into engagement with said pan.

8. A conveyor according to claim 7 wherein said means for supporting said cams for rocking movement about said last named axis comprises a rod extending transversely of the conveyor and journaled with respect to said trough for turning movement on its own axis, said cams being fixed to said rod, said rod having one end extending beyond said trough and having an end formed as a handle for effecting rocking movement of said rod.

9. A conveyor comprising a trough, a pan extending longitudinally of said trough and extending throughout the width thereof, said pan having a discharge end, a shaft arranged beyond said discharge end, sprockets carried by said shaft, conveyor chains passing around said sprockets and movable over said pan adjacent the side edges thereof, pushers connected between said chains and movable over said pan to move material to and beyond said discharge end, bearings for said shaft at the remote sides of said sprockets, carriers surrounding and supporting said bearings, a rod fixed at one end to each carrier and extending along the sides of said trough outwardly thereof, guides for each rod fixed to and projecting from the sides of said trough, the guides for each rod being spaced from each other longitudinally of said rod, a spring engaging one guide at each side of said trough and connected to the associated rod to exert a force thereagainst to tend to move the associated carrier to maintain said chains under tension, an apron extending beyond said discharge end and over said shaft, means for pivotally supporting said apron from said rods for turning movement on an axis extending transversely of the conveyor and beyond said discharge end whereby the end of said apron adjacent said pan is movable upwardly and downwardly, said end of said apron extending beneath the discharge end of said pan, and means selectively operable for supporting said end of said apron in engagement with said pan so that said apron forms substantially a continuation of said pan and for dropping said end of said apron to a position spaced below said end of said pan to form therewith a gap through which small articles can drop.

10. A conveyor according to claim 9 wherein said selectively operable means comprises cams arranged beneath and engaging said end of said apron, and means supporting said cams for rocking movement on an axis transverse to said conveyor.

11. A conveyor according to claim 10 wherein said means for supporting said cams comprises a rockable rod extending transversely of the conveyor and journaled to said trough.

12. A conveyor according to claim 10 wherein said means for supporting said cams comprises a rockable rod extending transversely of the conveyor and journaled to said trough, one end of said rockable rod being bent to extend in a plane parallel to the sides of said trough and having an extremity bent inwardly toward the adjacent side of said trough and engageable with the adjacent first named rod to limit turning movement of said rockable rod in one direction, said extremity of said rockable rod forming a handle for rocking said cams.

13. A conveyor according to claim 11 wherein each cam has a low point engaging said end of said apron to support it in a lower position in which it forms with said apron said gap for the falling from said pan of small articles, each cam having a high portion rockable in engagement with said end of said apron to support it in engagement with said pan, said high portion of each cam being flat and having a leading end portion thereof movable over and beyond a vertical plane through the turning axis of said rockable rod whereby said cams are held in position with said high portions of said cams engaging said end of said apron.

References Cited in the file of this patent

UNITED STATES PATENTS

| | | |
|---|---|---|
| 278,325 | Forwell | May 29, 1883 |
| 829,091 | Stone | Aug. 21, 1906 |
| 1,019,753 | Bruce | Mar. 12, 1912 |
| 1,056,767 | Allison | Mar. 25, 1913 |
| 1,574,164 | Oppenheim et al. | Feb. 23, 1926 |
| 2,895,231 | Sylvest | July 21, 1959 |
| 3,081,566 | Penote | Mar. 19, 1963 |

FOREIGN PATENTS

| | | |
|---|---|---|
| 742,773 | Great Britain | Jan. 4, 1956 |